United States Patent [19]
Smith et al.

[11] Patent Number: 5,890,026
[45] Date of Patent: Mar. 30, 1999

[54] CAMERA WITH ANTI-BOUNCE SHUTTER

[75] Inventors: Stephen J. Smith, Shortsville; Leonard Urman, Fairport, both of N.Y.

[73] Assignee: Eastman Kodak Company, Rochester, N.Y.

[21] Appl. No.: 4,352

[22] Filed: Jan. 8, 1998

[51] Int. Cl.⁶ .................................................. G03B 9/10
[52] U.S. Cl. ............................................................ 396/493
[58] Field of Search ............................................ 396/493

[56] References Cited

U.S. PATENT DOCUMENTS

| | | | |
|---|---|---|---|
| 316,647 | 4/1885 | Parsell et al. | 396/493 X |
| 828,538 | 8/1906 | Davis | 396/458 X |
| 3,439,599 | 4/1969 | Schwartz | 396/452 X |
| 3,492,931 | 2/1970 | Racki | 396/493 |
| 4,193,678 | 3/1980 | Son | 396/493 X |
| 5,381,200 | 1/1995 | Takagai | 396/493 |
| 5,717,970 | 2/1998 | Bryant et al. | 396/493 X |

FOREIGN PATENT DOCUMENTS 8-184944  7/1996  Japan .

*Primary Examiner*—W. B. Perkey
*Attorney, Agent, or Firm*—Roger A. Fields

[57] ABSTRACT

A camera comprises an exposure aperture, a shutter blade supported for pivotal movement from a covering position over the exposure aperture to an uncovering position removed from the exposure aperture and having an indentation along an edge of the shutter blade, and a striker movable within the indentation in a forward direction against one portion of the edge to pivot the shutter blade from its covering position to its uncovering position. The striker is movable in the forward direction out of the indentation when the shutter blade is pivoted to its uncovering position, in order to allow the shutter blade to be returned to its covering position, and is movable in a reverse direction to return to the indentation when the shutter blade is in its covering position. Another portion of the edge faces the one portion of the edge within the indentation to contact the striker in the indentation, in order to prevent the shutter blade from being dislodged from its covering position due to a physical shock to the shutter blade.

7 Claims, 3 Drawing Sheets

CAMERA WITH ANTI-BOUNCE SHUTTER

FIELD OF THE INVENTION

The invention relates generally to the field of photography, and in particular to cameras. More specifically, the invention relates to a camera with an anti-bounce shutter.

BACKGROUND OF THE INVENTION

Prior art U.S. Pat. No. 4,193,678 issued Mar. 18, 1990 discloses a camera that comprises an exposure aperture, a shutter blade supported for pivotal movement from a covering position over the exposure aperture to an uncovering position removed from the exposure aperture and having an indentation along an edge of the shutter blade, and a striker movable within the indentation in a forward direction against one portion of the edge to pivot the shutter blade from its covering position to its uncovering position. It appears that the striker remains in the indentation when the shutter blade is pivoted to its uncovering position and is moved in a reverse direction when the shutter blade is returned to its covering position. Also, it may be possible that a physical shock to the shutter blade, such as when the camera is dropped onto a hard surface, will dislodge the shutter blade from its covering position.

SUMMARY OF THE INVENTION

A camera comprising an exposure aperture, a shutter blade supported for pivotal movement from a covering position over the exposure aperture to an uncovering position removed from the exposure aperture and having an indentation along an edge of the shutter blade, and a striker movable within the indentation in a forward direction against one portion of the edge to pivot the shutter blade from its covering position to its uncovering position, is characterized in that:

the striker is movable in the forward direction out of the indentation when the shutter blade is pivoted to its uncovering position, in order to allow the shutter blade to be returned to its covering position, and is movable in a reverse direction to return to the indentation when the shutter blade is in its covering position; and another portion of the edge faces the one portion of the edge within the indentation to contact the striker in the indentation, in order to prevent the shutter blade from being dislodged from its covering position due to a physical shock to the shutter blade.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Figure 1:
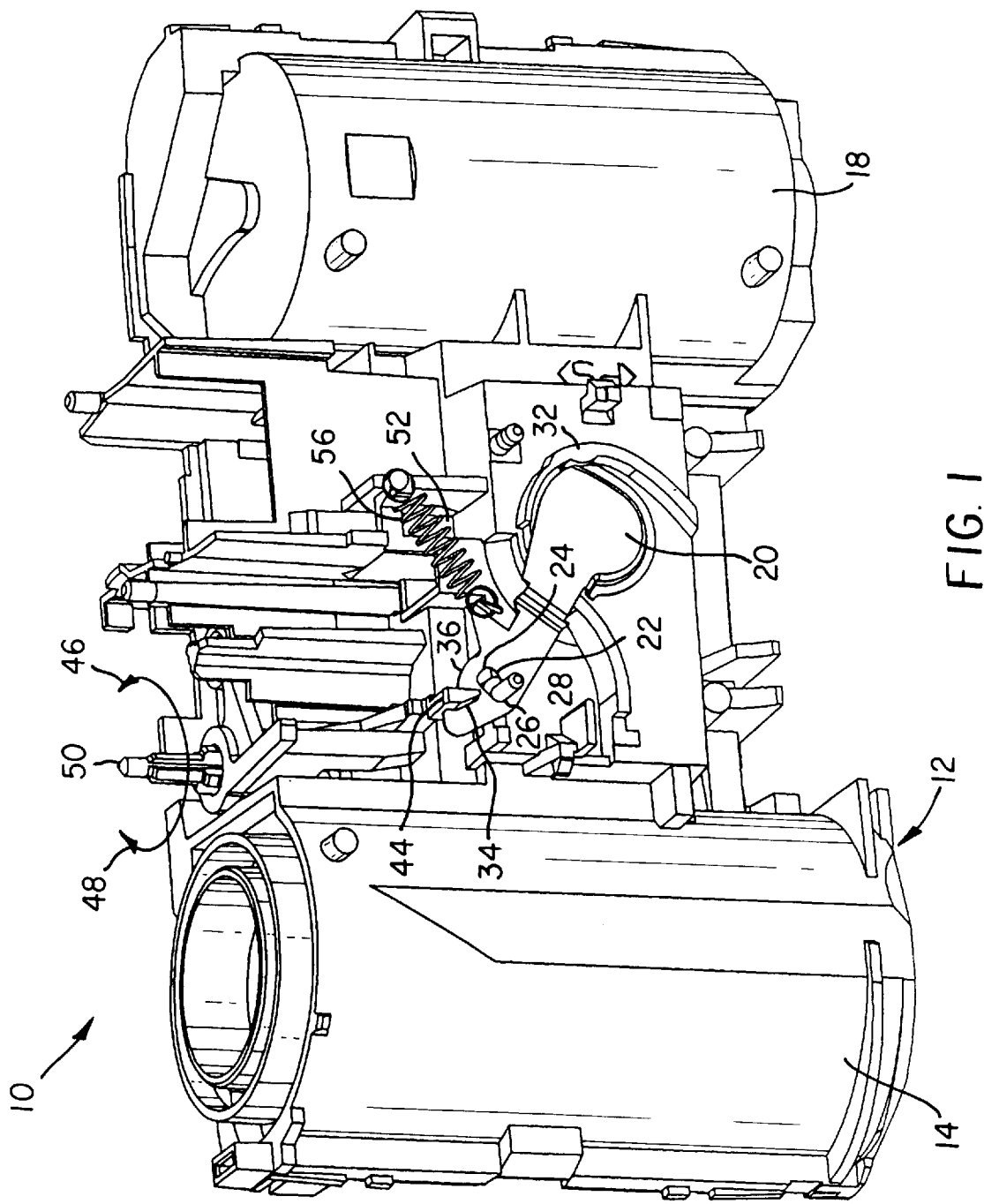
FIG. 1 is a front perspective view of the inside of a camera according to a preferred embodiment of the invention, showing a shutter blade in a covering position over an exposure aperture and a striker or high energy lever engaged with the shutter blade.
Figure 2:
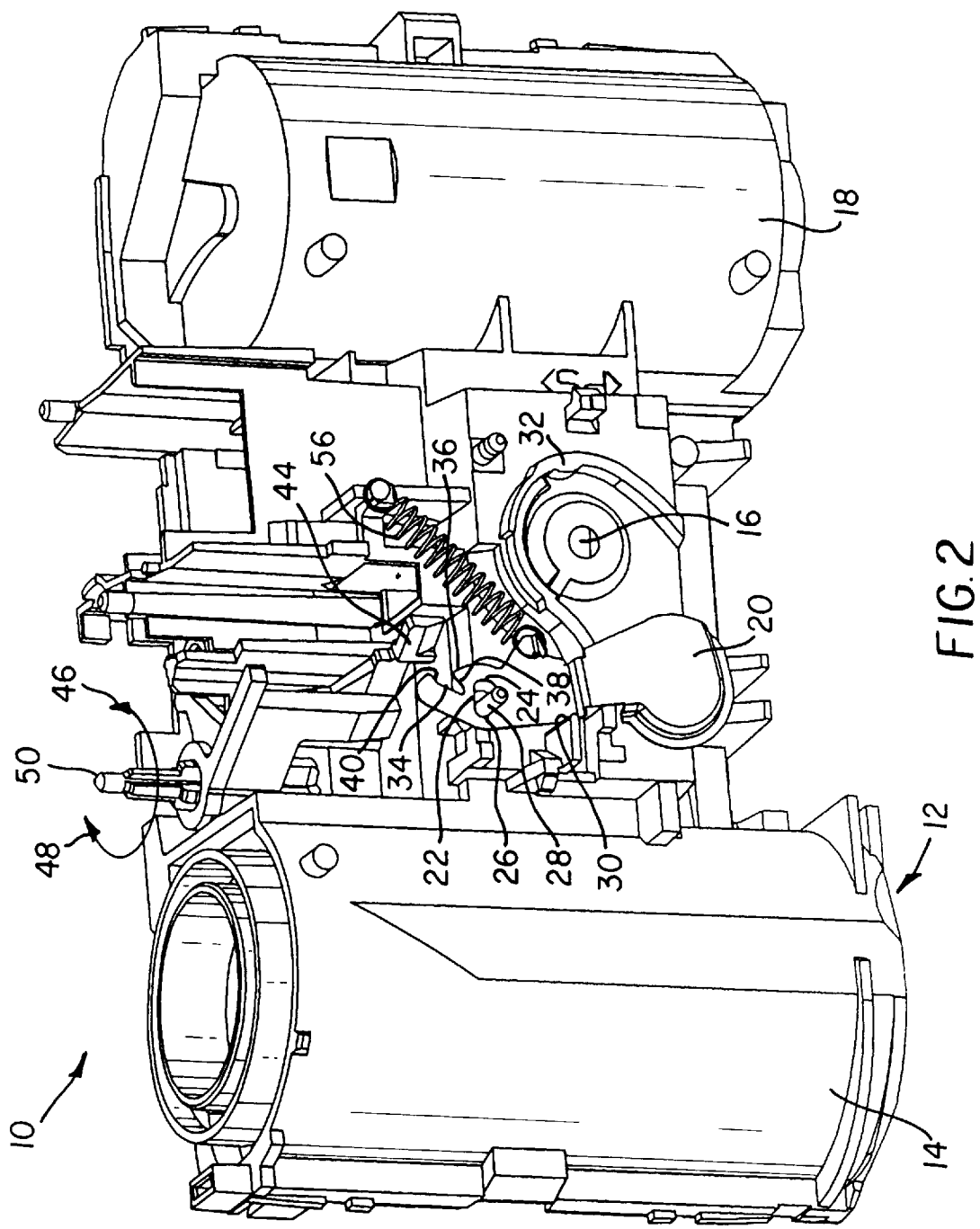
FIG. 2 is a front perspective view of the camera similar to FIG. 1, showing the a shutter blade in an uncovering position removed from the exposure aperture and the striker or high energy lever disengaged from the shutter blade.

Referring now to the drawings, FIGS. 1 and 2 show the inside of a one-time-use camera 10 comprising a main body part 12 having a cartridge receiving chamber 14, an exposure aperture 16, and an unexposed film roll chamber 18. After each film exposure is made at the exposure aperture 16, the exposed film frame is wound into a film cartridge (not shown) in the cartridge receiving chamber 14.

Figure 5:
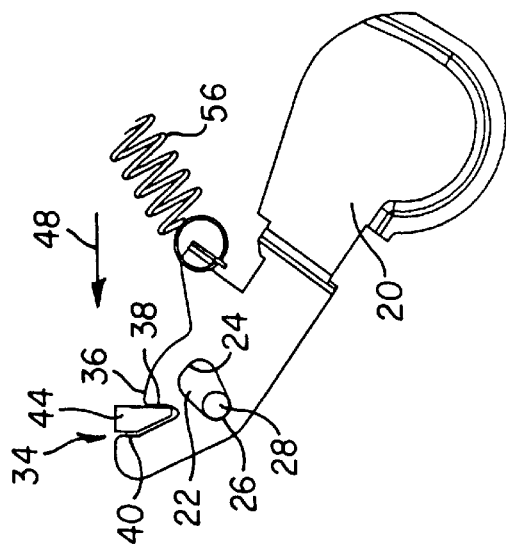
FIGS. 3, 4 and 5 are front elevation views of the shutter blade in its covering position and the striker or high energy lever being returned to engagement with the shutter blade.
Figure 3:
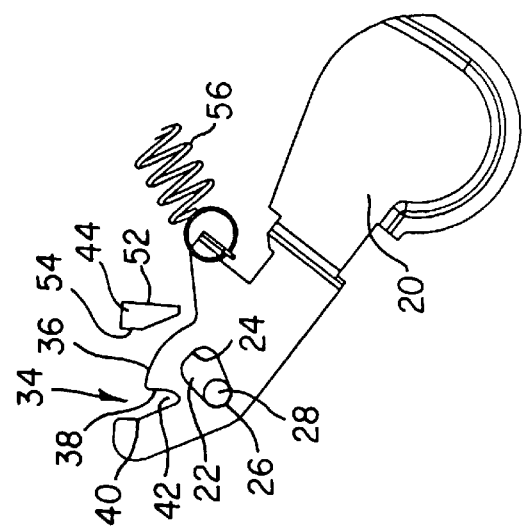

A shutter blade 20 includes a slot 22 having a pair of opposite ends 24 and 26, the first of which is an upper end and the second of which is a lower end in FIG. 1. A fixed post 28 projects from the main body part 12 through the slot 22, and is located adjacent the lower end 26 of the slot to support the shutter blade 20 for pivotal movement about the post between a covering position over the exposure aperture 16 in FIGS. 1 and 5 and an uncovering position removed from the exposure aperture in FIG. 2. A shutter-opening stop 30 projects from the main body part 12 to limit opening movement of the shutter blade 20. A shutter-closing stop 32 projects from the main body part 12 to limit closing movement of the shutter blade 20. A v-shaped indentation, i.e. a notch, 34 along a peripheral edge 36 of the shutter blade 20 is bounded by a shorter (lower) portion 38 of the peripheral edge and a longer (higher) portion 40 of the peripheral edge that face one another within the indentation and come together at a bottom portion 42 of the indentation. See FIG. 3. The shorter and longer edge portions 38 and 40 have distinctly different contours.

A striker or high energy lever 44 is supported for pivotal movement in forward and reverse directions 46 and 48 about a fixed post 50 that projects from the main body part 12. See FIGS. 1–5. One side 52 of the striker 44 has a contour that conforms, i.e. mates, with the contour of the shorter edge portion 38 within the indentation 34 in the shutter blade 20. . Another side 54 of the striker 44 has a contour that conforms, i.e. mates, with the contour of the longer edge portion 40 within the indentation 34 in the shutter blade 20.

When the striker 44 is first pivoted in the forward direction 46 within the indentation 34 in the shutter blade 20, its side 52 immediately pushes against the shorter edge portion 38 within the indentation to pivot the shutter blade from its covering position to its uncovering position against the shutter-opening stop 30. See FIG. 2. The striker 44 is then pivoted in the forward direction 46 out of the indentation 34. A return (closing) spring 56 pivots the shutter blade 20 back to its covering position against the shutter-closing stop 56.

Figure 4:
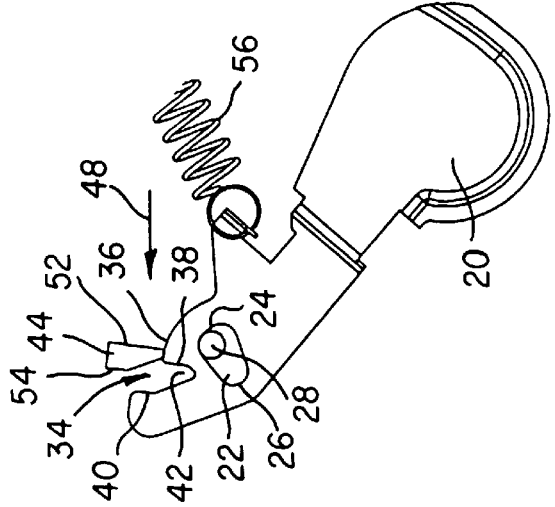

When the striker 44 is pivoted in the reverse direction 48 to return to the indentation 34 in the shutter blade 20, it pushes against the peripheral edge 36 of the shutter blade (outside the indentation as shown in FIG. 4) to lower the shutter blade along the slot 22 in the shutter blade. This moves the lower end 26 of the slot 22 away from the post 28 and moves the upper end 24 of the slot to the post. Once the peripheral edge 36 of the shutter blade 20 is out of the way of the striker 44, the striker is pivoted in the reverse direction 48 to a location over the indentation 34. Then, the return spring 56 raises the shutter blade 20 along the slot 22 in the shutter blade to cause the indentation 34 to receive the striker 44. See FIG. 3. This moves the upper end 24 of the slot 22 away from the post 28 and moves the lower end 26 of the slot to the post.

The invention has been described with reference to a preferred embodiment. However, it will be appreciated that variations and modifications can be effected by a person of ordinary skill in the art without departing from the scope of the invention.

PARTS LIST 10. camera
12. main body part
14. cartridge receiving chamber
16. exposure aperture
18. unexposed film roll chamber
20. shutter blade
22. slot
24. upperend
26. lower end
28. post
30. shutter-opening stop
32. shutter-closing stop
34. indentation
36. peripheral edge
38. shorter edge portion
40. longer edge portion
42. bottom indentation portion
44. striker
46. forward direction
48. reverse direction
50. post
52. striker side
54. striker side
56. return spring

What is claimed is:

1. A camera comprising an exposure aperture, a shutter blade supported for pivotal movement from a covering position over said exposure aperture to an uncovering position removed from the exposure aperture and having an indentation along an edge of said shutter blade, and a striker movable within said indentation in a forward direction against one portion of said edge to pivot said shutter blade from its covering position to its uncovering position, is characterized in that:

said striker is movable in said forward direction out of said indentation when said shutter blade is pivoted to its uncovering position, in order to allow said shutter blade to be returned to its covering position, and is movable in a reverse direction to return to said indentation when said shutter blade is in its covering position; and another portion of said edge faces said one portion of the edge within said indentation to contact said striker in the indentation, in order to prevent said shutter blade from being dislodged from its covering position due to a physical shock to the shutter blade.

2. A camera as recited in claim 1, wherein said other portion of said edge that faces said one portion of the edge within said indentation is longer than said one portion.

3. A camera as recited in claim 2, wherein said other portion and said one portion of said edge within said indentation form the indentation in a v-shape.

4. A camera as recited in claim 1, wherein said other portion and said one portion of said edge within said indentation have different contours, and said striker has a contour that is varied to conform with the respective contours of said other portion and said one portion of said edge.

5. A camera as recited in claim 1, wherein said other portion and said one portion of said edge within said indentation come together at a bottom portion of said indentation and are oriented erect when said shutter blade is in its covering position.

6. A camera as recited in claim 1, wherein said shutter blade includes a slot having a pair of opposite ends one being an upper end and the other being a lower end when the shutter blade is in its covering position, and a post extends through said slot adjacent said lower end to support said shutter blade for pivoting about said post between the covering and uncovering positions and to allow the shutter blade to be lowered along the slot to move said lower end away from said post and move said upper end towards said post to provide clearance for the striker to move in said reverse direction substantially to said indentation, and a spring urges said shutter blade to be raised along said slot to return said lower end to said post to cause said indentation to receive said striker.

7. A camera comprising an exposure aperture, a shutter blade having an indentation and being supported for pivotal movement from a covering position over said exposure aperture to an uncovering position removed from the exposure aperture, and a striker movable in a forward direction against one surface portion of said shutter blade within said indentation to pivot said shutter blade from its covering position to its uncovering position, is characterized in that:

another surface portion of said shutter blade faces said one surface portion of the shutter blade within said indentation to contact said striker in the indentation, in order to prevent said shutter blade from being dislodged from its covering position due to a physical shock to the shutter blade; and said one surface portion of said shutter blade is shorter than said other surface portion of the shutter blade to permit said striker to be moved out of said indentation when said shutter blade is pivoted to its covering position.

* * * * *